(12) United States Patent
McGough et al.

(10) Patent No.: US 9,999,926 B2
(45) Date of Patent: *Jun. 19, 2018

(54) HYDROTHERMAL METHOD FOR MANUFACTURING SILVER NANOWIRES

(71) Applicant: Dow Global Technologies LLC, Midland, MI (US)

(72) Inventors: Patrick T. McGough, Midland, MI (US); Janet M. Goss, Saginaw, MI (US); George J. Frycek, Midland, MI (US); George L. Athens, Freeland, MI (US); Wei Wang, Midland, MI (US); Jonathan D. Lunn, Pearland, TX (US); Robin P. Ziebarth, Midland, MI (US); Richard A. Patyk, Frankenmuth, MI (US)

(73) Assignee: Dow Global Technologies LLC, Midland, MI (US)

( * ) Notice: Subject to any disclaimer, the term of this patent is extended or adjusted under 35 U.S.C. 154(b) by 415 days.

This patent is subject to a terminal disclaimer.

(21) Appl. No.: 14/881,890

(22) Filed: Oct. 13, 2015

(65) Prior Publication Data

US 2016/0114393 A1    Apr. 28, 2016

Related U.S. Application Data

(60) Provisional application No. 62/069,435, filed on Oct. 28, 2014.

(51) Int. Cl.
| | |
|---|---|
| B22F 9/24 | (2006.01) |
| B22F 9/18 | (2006.01) |
| B22F 1/00 | (2006.01) |
| B82Y 40/00 | (2011.01) |

(52) U.S. Cl.
CPC .......... B22F 9/18 (2013.01); B22F 1/0025 (2013.01); B22F 9/24 (2013.01); *B22F 2201/03* (2013.01); *B22F 2301/255* (2013.01); *B22F 2304/05* (2013.01); *B82Y 40/00* (2013.01)

(58) Field of Classification Search
None
See application file for complete search history.

(56) References Cited

U.S. PATENT DOCUMENTS

| | | | |
|---|---|---|---|
| 7,585,349 B2 | 9/2009 | Xia et al. | |
| 7,749,299 B2 | 7/2010 | Vanheusden et al. | |
| 7,922,787 B2 | 4/2011 | Wang et al. | |
| 8,727,112 B2 | 5/2014 | Young et al. | |
| 8,876,937 B2 | 11/2014 | Peng et al. | |
| 9,776,249 B2* | 10/2017 | Wang | B22F 9/24 |
| 2008/0032047 A1 | 2/2008 | Parashar et al. | |
| 2009/0242231 A1 | 10/2009 | Miyagishima et al. | |
| 2009/0311530 A1 | 12/2009 | Hirai et al. | |
| 2010/0078197 A1 | 4/2010 | Miyagishima et al. | |
| 2010/0242679 A1 | 9/2010 | Yu et al. | |
| 2013/0152737 A1* | 6/2013 | Chen | B22F 9/18 75/370 |
| 2013/0255444 A1 | 10/2013 | Kawaguchi | |
| 2013/0272919 A1* | 10/2013 | Kim | B22F 9/24 420/501 |
| 2013/0283974 A1 | 10/2013 | Lunn et al. | |
| 2013/0334075 A1 | 12/2013 | Young et al. | |
| 2014/0231282 A1 | 8/2014 | Young et al. | |
| 2015/0266096 A1* | 9/2015 | Hou | B22F 9/24 75/370 |

FOREIGN PATENT DOCUMENTS

| | | |
|---|---|---|
| TW | 201024002 | 7/2010 |
| WO | 2003032084 | 4/2003 |

OTHER PUBLICATIONS

Korte, et al., Rapid synthesis of silver nanowires through a CuCl- or CuCl2- mediated polyol process, Journal of Materials Chemistry 18, pp. 437-441, (2007).
He, et al., Synthesis and characterization of silver nanowires with zigzag morphology in N,N dimethylformamide, Journal of Solid State Chemistry 180, pp. 2262-2267 (2007).
Zhao, et al., Synthesis and formation mechanism of silver nanowires by a templateless and seedless method, Chemistry Letters, vol. 34, No. 1, pp. 30-31 (2005).
Tang, et al., One-dimensional assemblies of nanoparticles: preparation, properties, and promise, Acvanced Materials 17, No. 8, pp. 951-962 (2005).
Xiong, et al., Formation of silver nanowires through a sandwiched reduction process, Acvanced Materials 15, No. 5, pp. 405-408 (2003).
Sarkar, et al., Effective chemical route for the synthesis of silver nanostructures in formamide, Res. Chem. Intermed 35, pp. 71-78 (2009).
Pastoriza-Santos, et al., Self-assembly of silver particle monolayers on glass from Ag+ solutions in DMG, J. of Colloid and Interface Science 221, pp. 236-241 (2000).
Mdluli, et al., An improved N,N-dimethylformamide and polyvinyl pyrrolidone approach for the synthesis of long silver nanowires, Journal of Alloys and Compounds 469, No. 5, pp. 519-522 (2009).
Walther, et al., Structure-tunable bidirectional hybrid nanowires via multicompartment cylinders, Nano Letters vol. 9, No. 5, pp. 2026-2030 (2009).
Pastoriza-Santos, et al., N,N-Dimethylformamide as a reaction medium for metal nanoparticle synthesis, Advanced Functional Materials 19, pp. 679-688 (2009).
Sun, et al., Polyol synthesis of uniform silver nanowires: a plausible growth mechanism and the supporting evidence, Nano Letters, vol. 3, No. 7, pp. 955-960 (2003).
Wiley, et al., Polyol synthesis of silver nanostructures: control of product morphology with Fe(II) or Fe(III) species, Langmuir, vol. 21, No. 18, pp. 8077-8080 (2005).
Ducamp-Sanguese, et al., Synthesis and characterization of fine monodisperse silver particles of uniform shape 100, pp. 272-280 (1992).

(Continued)

*Primary Examiner* — George P Wyszomierski
(74) *Attorney, Agent, or Firm* — Thomas S. Deibert

(57) ABSTRACT

A method for manufacturing high aspect ratio silver nanowires is provided, wherein a total glycol concentration is <0.001 wt % at all times.

10 Claims, No Drawings

(56) References Cited

OTHER PUBLICATIONS

Wiley, et al., Synthesis of silver nanostructures with controlled shapes and properties 40, pp. 1067-1076 (2007).
Giersig, et al., Evidence of an aggregate mechanism during the formation of silver nanowires in N,N-dimethylformamide, J. Mater. Chem. 14, pp. 607-610 (2004).
Zhao, et al., Low temperature synthesis and growth mechanism of silver nanowires by a soft-chemistry method, Acta Chimica Sinica, vol. 61, No. 10, pp. 1671-1674 (2003).
Pallavicine, et al., Self-assembled monolayers of silver nanoparticles firmly grafted on glass surfaces: low Ag+ release for an efficient antibacterial activity, J. of Colloid and Interface Science 350, pp. 110-116 (2010).
Pastoriza-Santos, et al., Formation and Stabilization of Silver Nanoparticles through Reduction by N,N-Dimethylformamide, Langmuir 15, pp. 948-951 (1999).
Copending U.S. Appl. No. 14/881,859.
Copending U.S. Appl. No. 14/881,924.
Copending U.S. Appl. No. 14/881,955.

* cited by examiner

HYDROTHERMAL METHOD FOR MANUFACTURING SILVER NANOWIRES

This application claims priority to U.S. Provisional Application No. 62/069,435 filed on Oct. 28, 2014.

The present invention relates generally to the field of manufacture of silver nanowires. In particular, the present invention is directed to a method for manufacturing silver nanowires exhibiting a high aspect ratio for use in various applications.

Films that exhibit a high conductivity with a high transparency are of great value for use as electrodes or coatings in a wide range of electronic applications, including, for example, touch screen displays and photovoltaic cells. Current technology for these applications involves the use of a tin doped indium oxide (ITO) containing films that are deposited through physical vapor deposition methods. The high capital cost of physical vapor deposition processes has led to the desire to find alternative transparent conductive materials and coating approaches. The use of silver nanowires dispersed as a percolating network has emerged as a promising alternative to ITO containing films. The use of silver nanowires potentially offer the advantage of being processable using roll to roll techniques. Hence, silver nanowires offer the advantage of low cost manufacturing with the potential of providing higher transparency and conductivity than conventional ITO containing films.

The "polyol process" has been disclosed for the manufacture of silver nanostructures. The polyol process uses ethylene glycol (or an alternative glycol) as both a solvent and a reducing agent in the production of silver nanowires. The use of glycols; however, has several inherent disadvantages. Specifically, using glycol as both the reducing agent and the solvent results in a decrease in control over the reaction as the principal reducing agent species (glycolaldehyde) is produced in situ and its presence and concentration are dependent on the extent of exposure to oxygen. Also, the use of glycol introduces the potential for the formation of combustible glycol/air mixtures in the headspace of the reactor used to produce the silver nanowires. Finally, the use of large volumes of glycol create disposal concerns, increasing the cost of commercializing such operations.

One alternative approach to the polyol process for manufacturing silver nanowires has been disclosed by Miyagishima, et al. in United States Patent Application Publication No. 20100078197. Miyagishima, et al. disclose a method for producing metal nanowires, comprising: adding a solution of a metal complex to a water solvent containing at least a halide and a reducing agent, and heating a resultant mixture at 150° C. or lower, wherein the metal nanowires comprise metal nanowires having a diameter of 50 nm or less and a major axis length of 5 μm or more in an amount of 50% by mass or more in terms of metal amount with respect to total metal particles.

Another alternative approach to the polyol process for manufacturing silver nanowires has been disclosed by Lunn, et al. in United States Patent Application Publication No. 20130283974. Lunn, et al. disclose a process for manufacturing high aspect ratio silver nanowires, wherein the recovered silver nanowires exhibit an average diameter of 25 to 80 nm and an average length of 10 to 100 μm; and, wherein the total glycol concentration is <0.001 wt % at all times during the process.

Notwithstanding, while producing desirable, high aspect ratio silver nanowires, the manufacturing method described by Lunn, et al. also results in the formation of silver nanowire populations having a broad diameter distribution which can result in non-uniformity in the electrical properties of films produced therewith.

Accordingly, there remains a need for alternative silver nanowire manufacturing methods. In particular, for methods of manufacturing silver nanowires that do not involve the use of glycol, wherein the silver nanowires produced exhibit a high aspect ratio (preferably >500) in combination with a narrow silver nanowire diameter distribution.

The present invention provides a method for manufacturing high aspect ratio silver nanowires, comprising: providing a container; providing water; providing a reducing sugar; providing a polyvinyl pyrrolidone (PVP), wherein the polyvinyl pyrrolidone (PVP) provided is dividable into a first part of the polyvinyl pyrrolidone (PVP) and a second part of the polyvinyl pyrrolidone (PVP); providing a source of copper (II) ions; providing a source of halide ions; providing a source of silver ions, wherein the source of silver ions provided is dividable into a first portion of the source of silver ions and a second portion of the source of silver ions; adding the water, the reducing sugar, the source of copper (II) ions and the source of halide ions to the container to form a combination; heating the combination to 110 to 160° C.; comingling the first part of the polyvinyl pyrrolidone (PVP) with the first portion of the source of silver ions to form a comingled polyvinyl pyrrolidone/source of silver ions; adding the comingled polyvinyl pyrrolidone/source of silver ions to the combination in the container to form a creation mixture; then, following a delay period, adding to the container the second part of the polyvinyl pyrrolidone (PVP) and the second portion of the source of silver ions to form a growth mixture; maintaining the growth mixture at 110 to 160° C. for a hold period of 2 to 30 hours to provide a product mixture; and, recovering a plurality of high aspect ratio silver nanowires from the product mixture; wherein a total glycol concentration in the container is <0.001 wt %.

The present invention provides a method for manufacturing high aspect ratio silver nanowires, comprising: providing a container; providing water; providing a reducing sugar; providing a polyvinyl pyrrolidone (PVP); providing a source of copper (II) ions; providing a source of halide ions; providing a source of silver ions; dividing the water into five separate volumes; combining a first volume of water with the reducing sugar to form a reducing sugar subcombination; combining a second volume of water with the polyvinyl pyrrolidone (PVP) provided to form a polyvinyl pyrrolidone (PVP) subcombination, wherein the polyvinyl pyrrolidone (PVP) subcombination is divided into a first part of the polyvinyl pyrrolidone (PVP) subcombination and a second part of the polyvinyl pyrrolidone (PVP) subcombination; combining a third volume of water with the source of copper (II) ions to form a copper (II) ion subcombination; combining a fourth volume of water with the source of halide ions to form a halide ion subcombination; combining a fifth volume of water with the source of silver ions provided to form a silver ion subcombination, wherein the silver ion subcombination is divided into a first portion of the silver ion subcombination and a second portion of the silver ion subcombination; adding the reducing sugar subcombination, the copper (II) ion subcombination and the halide ion subcombination to the container to form a combination; heating the combination to 110 to 160° C.; comingling the first part of the polyvinyl pyrrolidone (PVP) subcombination with the first portion of the silver ion subcombination to form a comingled polyvinyl pyrrolidone/silver ion subcombination; adding the comingled polyvinyl pyrrolidone/silver ion subcombination to the combination in the container to form a creation mixture; then, following a delay period, adding to the container the second part of the polyvinyl pyrrolidone (PVP) subcombination and the second portion of the silver ion subcombination to form a growth mixture; maintaining the growth mixture at 110 to 160° C. for a hold period of 2 to 30 hours to provide a product mixture; and, recovering a plurality of high aspect ratio silver nanowires from the product mixture; wherein a total glycol concentration in the container is <0.001 wt %.

DETAILED DESCRIPTION

A method for manufacturing high aspect ratio silver nanowires has been found which surprisingly provides silver nanowires having an average diameter of 20 to 60 nm and an average length of 20 to 100 μm, while avoiding the inherent disadvantages associated with the use of glycols and while providing silver nanowires having a high degree of diameter uniformity. Silver nanowire populations exhibiting a narrow diameter distribution such as those provided by the method of the present invention provide advantage in the preparation of films having more uniform conductive properties and transparency across the film.

The term "total glycol concentration" as used herein and in the appended claims means combined total of the concentration of all glycols (e.g., ethylene glycol, propylene glycol, butylene glycol, poly(ethylene glycol), poly(propylene glycol)) present in the container.

The term "high aspect ratio" as used herein and in the appended claims in reference to the recovered plurality of silver nanowires means that the average aspect ratio of the plurality of silver nanowires recovered is >500.

The term "silver nanoparticle fraction" or "$NP_F$" used herein and in the appended claims is the silver nanowire fraction of a sample of silver nanowires determined according to the following equation:

$$NP_F = NP_A/T_A$$

wherein $T_A$ is the total surface area of a substrate that is occluded by a given deposited sample of silver nanowires; and, $NP_A$ is the portion of the total occluded surface area that is attributable to silver nanoparticles having an aspect ratio of <3 included in the deposited sample of silver nanowires.

Preferably, the method for manufacturing high aspect ratio silver nanowires of the present invention, comprises: providing a container; providing water; providing a reducing sugar; providing a polyvinyl pyrrolidone (PVP), wherein the polyvinyl pyrrolidone (PVP) provided is dividable into a first part of the polyvinyl pyrrolidone (PVP) and a second part of the polyvinyl pyrrolidone (PVP); providing a source of copper (II) ions; providing a source of halide ions; providing a source of silver ions, wherein the source of silver ions provided is dividable into a first portion of the source of silver ions and a second portion of the source of silver ions; adding the water, the reducing sugar, the source of copper (II) ions and the source of halide ions to the container to form a combination; heating the combination to 110 to 160° C. (preferably, 120 to 155° C.; more preferably, 130 to 155° C.; most preferably, 150° C.); comingling the first part of polyvinyl pyrrolidone (PVP) with the first portion of the source of silver ions to form a comingled polyvinyl pyrrolidone/source of silver ions (preferably, wherein the first part of the polyvinyl pyrrolidone (PVP) and the first portion of the source of silver ions are comingled for a premix period of 0.5 seconds to 4 hours (preferably, 0.5 seconds to 1 hour; more preferably, 1 minute to 1 hour; most preferably, 5 minutes to 1 hour) to form the comingled polyvinyl pyrrolidone/source of silver ions before being added to the combination in the container); adding the comingled polyvinyl pyrrolidone/source of silver ions to the combination in the container (preferably, with agitation; preferably, wherein the comingled polyvinyl pyrrolidone/source of silver ions is added to the combination below a surface of the combination in the container) to form a creation mixture (preferably, while maintaining the combination at 110 to 160° C. (preferably, 120 to 155° C.; more preferably, 130 to 155° C.; most preferably, 150° C.) during addition of the comingled polyvinyl pyrrolidone/source of silver ions); then, following a delay period (preferably, wherein the delay period is 1 to 60 minutes (more preferably, 1 to 20 minutes; most preferably, 5 to 15 minutes)(preferably, wherein the creation mixture is cooled to 100 to 150° C. (preferably, 110 to 140° C.; more preferably, 120 to 135° C.; most preferably, 125 to 135° C.) during the delay period), adding to the container the second part of the polyvinyl pyrrolidone (PVP) and the second portion of the source of silver ions to form a growth mixture; maintaining the growth mixture at 100 to 150° C. (preferably, 110 to 140° C.; more preferably, 120 to 140° C.; most preferably, 125 to 135° C.) for a hold period of 2 to 30 hours (preferably, 4 to 20 hours; more preferably, 6 to 18 hours; most preferably, 7 to 10 hours) to provide a product mixture; and, recovering a plurality of high aspect ratio silver nanowires from the product mixture; wherein a total glycol concentration in the container is <0.001 wt % at all times during the method for manufacturing high aspect ratio silver nanowires; (preferably, wherein the polyvinyl pyrrolidone (PVP) provided and the source of silver ions provided are added to the container at a weight ratio of polyvinyl pyrrolidone (PVP) to silver ions of 4:1 to 10:1; and, wherein the source of halide ions provided and the source of copper (II) ions provided are added to the container at a weight ratio of halide ions to copper (II) ions of 1:1 to 5:1; wherein the plurality of high aspect ratio silver nanowires exhibit an average diameter of 20 to 80 nm and an average length of 10 to 100 μm (preferably, wherein the plurality of silver nanowires recovered exhibit an average aspect ratio>500)).

Preferably, in the method for manufacturing high aspect ratio silver nanowires of the present invention, the polyvinyl pyrrolidone (PVP) provided is divided into a first part of the polyvinyl pyrrolidone (PVP) and a second part of the polyvinyl pyrrolidone (PVP); and, the source of silver ions provided is divided into a first portion of the source of silver ions and a second portion of the source of silver ions; wherein the first part of the polyvinyl pyrrolidone (PVP) is comingled with the first portion of the source of silver ions to form the comingled polyvinyl pyrrolidone/source of silver ions; wherein the remaining polyvinyl pyrrolidone (PVP) is the second part of the polyvinyl pyrrolidone (PVP); and, wherein the remaining source of silver ions is the second portion of the of the source of silver ions. Preferably, the first part of the polyvinyl pyrrolidone (PVP) is 10 to 40 wt % (preferably, 10 to 30 wt %; more preferably, 15 to 25 wt %; most preferably, 20 wt %) of the polyvinyl pyrrolidone (PVP) provided; and, the first portion of the source of silver ions is 10 to 40 wt % (preferably, 10 to 30 wt %; more preferably, 15 to 25 wt %; most preferably, 20 wt %) of the source of silver ions provided. Preferably, the comingled polyvinyl pyrrolidone/source of silver ions is added to the combination in the container over a charge time of 10 seconds to 10 minutes (more preferably, 30 seconds to 5 minutes; most preferably, 30 to 90 seconds). Preferably, the second part of the polyvinyl pyrrolidone (PVP) and the second portion of the source of silver ions are added to the container over a feed time of 1 to 60 minutes (more preferably, 1 to 30 minutes; most preferably, 1 to 15 minutes).

Preferably, in the method for manufacturing high aspect ratio silver nanowires of the present invention, the polyvinyl pyrrolidone (PVP) provided is divided into a first part and a second part and the source of silver ions provided is divided into a first portion and a second portion; wherein the first part of the polyvinyl pyrrolidone (PVP) and the first portion of the source of silver ions are comingled to form the comingled polyvinyl pyrrolidone/source of silver ions. Preferably, the first part of the polyvinyl pyrrolidone (PVP) and the first portion of the source of silver ions are comingled for a premix period of 0.5 seconds to 4 hours (preferably, 0.5 seconds to 1 hour; more preferably, 1 minute to 1 hour; most preferably, 5 minutes to 1 hour) to form the comingled polyvinyl pyrrolidone/source of silver ions. The first part of the polyvinyl pyrrolidone (PVP) and the first portion of the source of silver ions are comingled for the premix period using any method known to one of ordinary skill in the art. Preferably, the first part of the polyvinyl pyrrolidone (PVP) and the first portion of the source of silver ions are comingled by at least one of mixing the first part of the polyvinyl pyrrolidone (PVP) and the first portion of the source of silver ions in a closed container (preferably, under an inert atmosphere such as nitrogen); and, simultaneously transferring the first part of the polyvinyl pyrrolidone (PVP) and the first portion of the source of silver ions through a common conduit to the combination in the container. When the residence time in a common conduit for the first part of the polyvinyl pyrrolidone (PVP) and the first portion of the source of silver ions is equal to the premix period, the premix period is preferably 2 to 30 seconds; more preferably, 2 to 15 seconds; most preferably, 2 to 10 seconds).

Preferably, in the method for manufacturing high aspect ratio silver nanowires of the present invention, the second part of the polyvinyl pyrrolidone (PVP) and the second portion of the source of silver ions can be added to the container contents sequentially, simultaneously as separate feeds, simultaneously as a comingled feed or some combination thereof (e.g., some sequentially, some simultaneously as separate feeds and some simultaneously as a comingled feed). Preferably, at least one of the second part of the polyvinyl pyrrolidone (PVP) and the second portion of the source of silver ions are added to the container at a point below a surface of the combination in the container. More preferably, at least the second portion of the source of silver ions is added to the container at a point below a surface of the combination in the container. Preferably, the second part of the polyvinyl pyrrolidone (PVP) and the second portion of the source of silver ions are added to the container simultaneously as separate feeds, simultaneously as a comingled feed or a combination thereof (e.g., some simultaneously as separate feeds and some simultaneously as a comingled feed). Most preferably, the second part of the polyvinyl pyrrolidone (PVP) and the second portion of the source of silver ions are added to the container as a comingled feed. Preferably, the comingled feed is added to the combination at a point below a surface of the combination in the container. The comingled feed can be formed in the same manner as described for the formation of the comingled polyvinyl pyrrolidone/source of silver ions, wherein the second part of the polyvinyl pyrrolidone (PVP) and the second portion of the source of silver ions used are comingled for a comingling period 0.5 seconds to 4 hours (preferably, 0.5 seconds to 2 hours; more preferably, 5 minutes to 1.5 hours; most preferably, 5 minutes to 1 hour) to form the comingled feed. Preferably, the comingling period is ≥ the premix period.

Preferably, the water provided in the method for manufacturing high aspect ratio silver nanowires of the present invention is at least one of deionized and distilled to limit incidental impurities. More preferably, the water provided in the method for manufacturing high aspect ratio silver nanowires of the present invention is deionized and distilled. Most preferably, the water provided in the method for manufacturing high aspect ratio silver nanowires of the present invention is ultrapure water that meets or exceeds the Type 1 water requirements according to ASTM D1193-99e1 (Standard Specification for Reagent Water).

Preferably, the reducing sugar provided in the method for manufacturing high aspect ratio silver nanowires of the present invention is selected from the group consisting of at least one of aldoses (e.g., glucose, glyceraldehyde, galactose, mannose); disaccharides with a free hemiacetal unit (e.g., lactose and maltose); and ketone bearing sugars (e.g., fructose). More preferably, the reducing sugar provided in the method for manufacturing high aspect ratio silver nanowires of the present invention is selected from the group consisting of at least one of an aldose, lactose, maltose and fructose. Still more preferably, the reducing sugar provided in the method for manufacturing high aspect ratio silver nanowires of the present invention is selected from the group consisting of at least one of glucose, glyceraldehyde, galactose, mannose, lactose, fructose and maltose. Most preferably, the reducing sugar provided in the method for manufacturing high aspect ratio silver nanowires of the present invention is D-glucose.

Preferably, the polyvinyl pyrrolidone (PVP) provided in the method for manufacturing high aspect ratio silver nanowires of the present invention has a weight average molecular weight, $M_W$, of 20,000 to 300,000 Daltons. More preferably, the polyvinyl pyrrolidone (PVP) provided in the method for manufacturing high aspect ratio silver nanowires of the present invention has a weight average molecular weight, $M_W$, of 30,000 to 200,000 Daltons. Most preferably, the polyvinyl pyrrolidone (PVP) provided in the method for manufacturing high aspect ratio silver nanowires of the present invention has a weight average molecular weight, $M_W$, of 40,000 to 60,000 Daltons.

Preferably, the source of copper (II) ions provided in the method for manufacturing high aspect ratio silver nanowires of the present invention is selected from the group consisting of at least one of $CuCl_2$ and $Cu(NO_3)_2$. More preferably, the source of copper (II) ions provided in the method for manufacturing high aspect ratio silver nanowires of the present invention is selected from the group consisting of $CuCl_2$ and $Cu(NO_3)_2$. Most preferably, the source of copper (II) ions provided in the method for manufacturing high aspect ratio silver nanowires of the present invention is $CuCl_2$, wherein the $CuCl_2$ is a copper (II) chloride dihydrate.

Preferably, the source of halide ions provided in the method for manufacturing high aspect ratio silver nanowires of the present invention is selected from the group consisting of at least one of a source of chloride ions, a source of fluoride ions, a source of bromide ions and a source of iodide ions. More preferably, the source of halide ions provided in the method for manufacturing high aspect ratio silver nanowires of the present invention is selected from the group consisting of at least one of a source of chloride ions and a source of fluoride ions. Still more preferably, the source of halide ions provided in the method for manufacturing high aspect ratio silver nanowires of the present invention is a source of chloride ions. Most preferably, the source of halide ions provided in the method for manufacturing high aspect ratio silver nanowires of the present invention is a source of chloride ions, wherein the source of chloride ions is an alkali metal chloride. Preferably, the alkali metal chloride is selected from the group consisting of at least one of sodium chloride, potassium chloride and lithium chloride. More preferably, the alkali metal chloride is selected from the group consisting of at least one of sodium chloride and potassium chloride. Most preferably, the alkali metal chloride is sodium chloride.

Preferably, the source of silver ions provided in the method for manufacturing high aspect ratio silver nanowires of the present invention is a silver complex. More Preferably, the source of silver ions provided in the method for manufacturing high aspect ratio silver nanowires of the present invention is a silver complex; wherein the silver complex is selected from the group consisting of at least one of silver nitrate ($AgNO_3$) and silver acetate ($AgC_2H_3O_2$). Most preferably, the source of silver ions provided in the method for manufacturing high aspect ratio silver nanowires of the present invention is silver nitrate ($AgNO_3$). Preferably, the source of silver ions provided in the method for manufacturing high aspect ratio silver nanowires of the present invention has a silver concentration of 0.005 to 1 molar (M)(more preferably, of 0.01 to 0.1 M; most preferably, of 0.015 to 0.05 M).

Preferably, the water, the reducing sugar, the source of copper (II) ions, the source of halide ions and the pH adjusting agent, if any, are added to the container in any order in individual sequence (i.e., one at a time), simultaneously (i.e., all at the same time), or semi-simultaneously (i.e., some individually one at a time, some simultaneously at the same time or as subcombinations). More preferably, at least two of the water, the reducing sugar, the source of copper (II) ions, the source of halide ions and the pH adjusting agent are mixed together to form a subcombination before addition to the container.

Preferably, the water is divided into multiple volumes (preferably, at least two volumes of water; more preferably, at least three volumes of water; most preferably, at least five volumes of water) that are then mixed with one or more of the reducing sugar, the source of copper (II) ions, the source of halide ions, the pH adjusting agent, the polyvinyl pyrrolidone (PVP) provided and the source of silver ions provided to form various subcombinations that include water before addition to the container. For example, the water is preferably divided into at least five volumes, wherein a first volume of water is combined with the reducing sugar to form a reducing sugar containing subcombination, wherein a second volume of water is combined with the source of copper (II) ions to form a copper (II) ion containing subcombination, wherein a third volume of water is combined with the source of halide ions to form a halide ion containing subcombination; wherein a forth volume of water is combined with the source of silver ions provided to form a silver ion containing subcombination (preferably, wherein the silver ion containing subcombination is divided into a first portion and a second portion); and a fifth volume of water is combined with the polyvinyl pyrrolidone (PVP) provided to form a polyvinyl pyrrolidone (PVP) containing subcombination (preferably, the polyvinyl pyrrolidone (PVP) containing subcombination is divided into a first part and a second part). These subcombinations are then processed in similar fashion to the single components in the previous discussion of the method for manufacturing high aspect ratio silver nanowires of the present invention.

The method for manufacturing high aspect ratio silver nanowires of the present invention preferably further comprises: providing a reducing agent; and, adding the reducing agent to the creation mixture.

Preferably, the reducing agent provided in the method for manufacturing high aspect ratio silver nanowires of the present invention is selected from the group consisting of ascorbic acid, sodium borohydride ($NaBH_4$), hydrazine, salts of hydrazine, hydroquinone, $C_{1-5}$ alkyl aldehyde and benzaldehyde. More preferably, the reducing agent provided in the method for manufacturing high aspect ratio silver nanowires of the present invention is selected from the group consisting of ascorbic acid, sodium borohydride ($NaBH_4$), hydrazine, salts of hydrazine, hydroquinone, acetaldehyde, propionaldehyde and benzaldehyde. Most preferably, the reducing agent provided in the method for manufacturing high aspect ratio silver nanowires of the present invention is selected from the group consisting of ascorbic acid and sodium borohydride.

The method for manufacturing high aspect ratio silver nanowires of the present invention preferably further comprises: providing a pH adjusting agent; and, adding the pH adjusting agent to the container. The pH adjusting agent can be added to the container before the comingled polyvinyl pyrrolidone/source of silver ions is added to the container. Preferably, when the pH adjusting agent is added to the combination before adding the comingled polyvinyl pyrrolidone/source of silver ions; wherein the combination has a pH of 2.0 to 4.0 (preferably, 2.0 to 3.5; more preferably, 2.4 to 3.3; most preferably, 2.4 to 2.6) before adding the comingled polyvinyl pyrrolidone/source of silver ions to the container. The pH adjusting agent can be added to the container simultaneously with the comingled polyvinyl pyrrolidone/source of silver ions. Preferably, when the pH adjusting agent is added simultaneously with the comingled polyvinyl pyrrolidone/source of silver ions, the pH adjusting agent is added to the first part of the polyvinyl pyrrolidone (PVP) before comingling with the first portion of the source of silver ions to form the comingled polyvinyl pyrrolidone/source of silver ions, wherein the first part of the polyvinyl pyrrolidone (PVP) has a pH of 2.0 to 4.0 (preferably, 2.0 to 3.5; more preferably, 2.3 to 3.3; most preferably, 3.1 to 3.3). Preferably, when the pH adjusting agent is added simultaneously with the comingled polyvinyl pyrrolidone/source of silver ions, the pH adjusting agent is also added to second part of the polyvinyl pyrrolidone (PVP), wherein the second part of the polyvinyl pyrrolidone (PVP) has a pH of 2.0 to 4.0 (preferably, 2.0 to 3.5; more preferably, 2.3 to 3.3; most preferably, 3.1 to 3.3). Preferably, the pH adjusting agent is added to the polyvinyl pyrrolidone (PVP) provided before dividing the polyvinyl pyrrolidone (PVP) provided into a first part and a second part, wherein the polyvinyl pyrrolidone (PVP) provided has a pH of 2.0 to 4.0 (preferably, 2.0 to 3.5; more preferably, 2.3 to 3.3; most preferably, 3.1 to 3.3).

Preferably, the pH adjusting agent provided in the method for manufacturing high aspect ratio silver nanowires of the present invention is an acid. More preferably, the pH adjusting agent provided in the method for manufacturing high aspect ratio silver nanowires of the present invention is an acid, wherein the acid is selected from the group consisting of at least one of inorganic acids (e.g., nitric acid, sulfuric acid, hydrochloric acid, fluorosulfuric acid, phosphoric acid, fluoroantimonic acid) and organic acids (e.g., methane sulfonic acid, ethane sulfonic acid, benzene sulfonic acid, acetic acid, fluoroacetic acid, chloroacetic acid, citric acid, gluconic acid, lactic acid). Preferably, the pH adjusted agent provided in the method for manufacturing high aspect ratio silver nanowires of the present invention has a pH of <2.0. Still more preferably, the pH adjusting agent provided in the method for manufacturing high aspect ratio silver nanowires of the present invention includes nitric acid. Most preferably, the pH adjusting agent provided in the method for manufacturing high aspect ratio silver nanowires of the present invention is aqueous nitric acid.

Preferably, the method for manufacturing high aspect ratio silver nanowires of the present invention, further comprises: purging a container vapor space in contact with the combination in the container to provide a reduced oxygen gas concentration in the container vapor space. Preferably, the step of purging the container vapor space in contact with the combination in the container to provide the reduced oxygen gas concentration in the container vapor space, includes: (i) isolating the container vapor space from a surrounding atmosphere outside the container; (ii) then pressuring the container vapor space with an inert gas (preferably, wherein the inert gas is selected from the group consisting of argon, helium, methane, and nitrogen (more preferably, argon, helium and nitrogen; still more preferably, argon and nitrogen; most preferably, nitrogen)); and, (iii) then purging the container vapor space to provide the reduced oxygen gas concentration in the container vapor space. Preferably, the container vapor space is purged down to a container pressure that is > an atmospheric pressure of the surrounding atmosphere) to provide the reduced oxygen gas concentration in the container vapor space. Preferably, the reduced oxygen gas concentration is ≤2,000 ppm (more preferably, ≤400 ppm; most preferably; ≤20 ppm)). More preferably, the step of purging the container vapor space in contact with the combination in the container to provide the reduced oxygen gas concentration in the container vapor space, includes: (i) isolating the container vapor space from a surrounding atmosphere outside the container; (ii) then pressuring the container vapor space with an inert gas (preferably, wherein the inert gas is selected from the group consisting of argon, helium, methane, and nitrogen (more preferably, argon, helium and nitrogen; still more preferably, argon and nitrogen; most preferably, nitrogen)); and, (iii) then purging the container vapor space to provide the reduced oxygen gas concentration in the container vapor space (preferably, wherein the container vapor space is purged down to a container pressure that is > an atmospheric pressure of the surrounding atmosphere outside the container); and, (iv) repeating steps (ii) and (iii) at least three times to provide the reduced oxygen gas concentration in the container vapor space (preferably, wherein the reduced oxygen gas concentration is ≤2,000 ppm (more preferably, ≤400 ppm; most preferably; ≤20 ppm)). Preferably, the method for manufacturing high aspect ratio silver nanowires of the present invention, further comprises: maintaining the reduced oxygen gas concentration in the container vapor space during addition of the comingled polyvinyl pyrrolidone/source of silver ions, during formation of the growth mixture, and during the hold period.

Preferably, the method for manufacturing high aspect ratio silver nanowires of the present invention, further comprises: sparging the source of silver ions provided with an inert gas to extract entrained oxygen gas from the source of silver ions and to provide a low oxygen gas concentration in a silver ion vapor space in contact with the source of silver ions. Preferably, the step of sparging the source of silver ions provided with an inert gas comprises (preferably, consists of): sparging the source of silver ions provided with an inert gas (preferably, wherein the inert gas is selected from the group consisting of argon, helium, methane, and nitrogen (more preferably, argon, helium and nitrogen; still more preferably, argon and nitrogen; most preferably, nitrogen)) for a sparging time of ≥5 minutes (more preferably, 5 minutes to 2 hours; most preferably, 5 minutes to 1.5 hours) before addition to the container to extract entrained oxygen gas from the source of silver ions provided and to provide a low oxygen gas concentration in the silver ion vapor space. Preferably, the low oxygen gas concentration in the silver ion vapor space is ≤10,000 ppm (preferably; ≤1,000 ppm; more preferably, ≤400 ppm; most preferably; ≤20 ppm). Preferably, the method for manufacturing high aspect ratio silver nanowires of the present invention, further comprises: maintaining the low oxygen gas concentration in the silver ion vapor space until the source of silver ions provided is added to the container.

Preferably, the method for manufacturing high aspect ratio silver nanowires of the present invention, further comprises: purging a PVP vapor space in contact with the polyvinyl pyrrolidone (PVP) provided to provide a diluted oxygen gas concentration in the PVP vapor space. Preferably, the step of purging the PVP vapor space to provide the diluted oxygen gas concentration in the PVP vapor space, includes: (i) isolating the polyvinyl pyrrolidone (PVP) provided; (ii) then pressuring the PVP vapor space with an inert gas (preferably, wherein the inert gas is selected from the group consisting of argon, helium, methane, and nitrogen (more preferably, argon, helium and nitrogen; still more preferably, argon and nitrogen; most preferably, nitrogen)); and, (iii) then purging the PVP vapor space to provide the diluted oxygen gas concentration in the PVP vapor space. Preferably, the PVP vapor space is purged down to a pressure that is > an atmospheric pressure of the surrounding atmosphere to provide the diluted oxygen gas concentration in the PVP vapor space. More preferably, the step of purging the PVP vapor space to provide the diluted oxygen gas concentration in the PVP vapor space, includes: (i) isolating the polyvinyl pyrrolidone (PVP) provided; (ii) then pressuring the PVP vapor space with an inert gas (preferably, wherein the inert gas is selected from the group consisting of argon, helium, methane, and nitrogen (more preferably, argon, helium and nitrogen; still more preferably, argon and nitrogen; most preferably, nitrogen)); (iii) then purging the PVP vapor space to provide the diluted oxygen gas concentration in the PVP vapor space (preferably, wherein the PVP vapor space is purged down to an inert gas pressure that is > an atmospheric pressure); and, (iv) repeating steps (ii) and (iii) at least three times to provide the diluted oxygen gas concentration in the PVP vapor space. Preferably, the diluted oxygen gas concentration in the PVP vapor space is ≤10,000 ppm (preferably; ≤1,000 ppm; more preferably, ≤400 ppm; most preferably; ≤20 ppm). Preferably, the method for manufacturing high aspect ratio silver nanowires of the present invention, further comprises: maintaining the diluted oxygen gas concentration in the PVP vapor space until the polyvinyl pyrrolidone (PVP) provided is added to the container.

Preferably, the method for manufacturing high aspect ratio silver nanowires of the present invention, further comprises: purging a container vapor space in contact with the combination in the container to provide a reduced oxygen gas concentration in the container vapor space; sparging the source of silver ions provided with an inert gas to extract entrained oxygen gas from the source of silver ions provided and to provide a low oxygen gas concentration in a silver ion vapor space in contact with the source of silver ions provided; purging a PVP vapor space in contact with the polyvinyl pyrrolidone (PVP) provided to provide a diluted oxygen gas concentration in the PVP vapor space; maintaining the low oxygen gas concentration in the silver ion vapor space and the diluted oxygen gas concentration in the PVP vapor space; and, maintaining the reduced oxygen gas concentration in the container vapor space during addition of the comingled polyvinyl pyrrolidone/source of silver ions, during formation of the growth mixture, and during the hold period.

Preferably, in the method for manufacturing high aspect ratio silver nanowires of the present invention, the total glycol concentration in the container is <0.001 wt % at all times during the method.

Preferably, in the method for manufacturing high aspect ratio silver nanowires of the present invention, the polyvinyl pyrrolidone (PVP) and the source of silver ions are added to the container at a weight ratio of polyvinyl pyrrolidone (PVP) to silver ions of 4:1 to 10:1 (more preferably, 5:1 to 8:1; most preferably, 6:1 to 7:1).

Preferably, in the method for manufacturing high aspect ratio silver nanowires of the present invention, the source of halide ions and the source of copper (II) ions are added to the container at a weight ratio of halide ions to copper (II) ions of 1:1 to 5:1 (more preferably, 2:1 to 4:1; most preferably, 2.5:1 to 3.5:1).

Preferably, in the method for manufacturing high aspect ratio silver nanowires of the present invention, the plurality of silver nanowires recovered exhibit an average diameter of ≤40 nm (preferably, 20 to 40 nm; more preferably, 20 to 35; most preferably, 20 to 30 nm). More preferably, in the method for manufacturing high aspect ratio silver nanowires of the present invention, the plurality of silver nanowires recovered exhibit an average diameter of ≤40 nm (preferably, 20 to 40 nm; more preferably, 20 to 35; most preferably, 20 to 30 nm) and an average length of 10 to 100 μm. Preferably, the plurality of silver nanowires recovered exhibit an average aspect ratio of >500.

Preferably, in the method for manufacturing high aspect ratio silver nanowires of the present invention, the plurality of silver nanowires recovered exhibit a diameter standard deviation of ≤26 nm (preferably, 1 to 26 nm; more preferably, 5 to 20 nm; most preferably, 10 to 15 nm). More preferably, in the method for manufacturing high aspect ratio silver nanowires of the present invention, the plurality of silver nanowires recovered exhibit an average diameter of ≤40 nm (preferably, 20 to 40 nm; more preferably, 20 to 35; most preferably, 20 to 30 nm) with a diameter standard deviation of ≤26 nm (preferably, 1 to 26 nm; more preferably, 5 to 20 nm; most preferably, 10 to 15 nm). Most preferably, in the method for manufacturing high aspect ratio silver nanowires of the present invention, the plurality of silver nanowires recovered exhibit an average diameter of ≤40 nm (preferably, 20 to 40 nm; more preferably, 20 to 35; most preferably, 20 to 30 nm) with a diameter standard deviation of ≤26 nm (preferably, 1 to 26 nm; more preferably, 5 to 20 nm; most preferably, 10 to 15 nm) and an average length of 10 to 100 μm.

Some embodiments of the present invention will now be described in detail in the following Examples.

The water used in the following Examples was obtained using a ThermoScientific Barnstead NANOPure purification system with a 0.2 μm pore size hollow fiber filter positioned downstream of the water purification unit.

Example S1: Halide Ion Subcombination

The halide ion subcombination used herein in certain Examples was prepared by dissolving sodium chloride (0.2104 g; available from Sigma Aldrich) in water (900 mL).

Example S2: Copper (II) Ion Subcombination

The copper (II) ion subcombination used herein in certain Examples was prepared by dissolving copper (II) chloride dihydrate (0.6137 g; available from Sigma Aldrich) in water (900 mL).

Example S3: Reducing Sugar/Copper (II) Ion/Halide Ion Subcombination

The reducing sugar/copper (II) ion/halide ion subcombination used herein in certain Examples was prepared by adding 13.5 g of D-glucose to water (2159 mL) in a flask. Then adding 21.3 mL of the halide ion subcombination prepared according to Example S1 to the flask. Then adding 21.3 mL of the copper (II) ion subcombination prepared according to Example S2 to the flask.

Example S4: Polyvinyl Pyrrolidone (PVP) Subcombination

The polyvinyl pyrrolidone (PVP) subcombination used herein in certain Examples was prepared by adding polyvinyl pyrrolidone (52.2 g; weight average molecular weight of 50,000 g/mol Sokalan® K30 P available from BASF) to water (381 mL) in a flask and then rinsing the transfer equipment with water (203 mL) into the flask.

Example S5: Silver Ion Subcombination

The silver ion subcombination used herein in certain Examples was prepared by adding $AgNO_3$ (12.7 g; ACS reagent grade, ≥99.0% available from Sigma Aldrich) to water (152 mL) in a flask.

Example S6: Comingled Polyvinyl Pyrrolidone/Silver Ion Subcombination

The comingled polyvinyl pyrrolidone/silver ion subcombination used herein in certain Examples was prepared by adjusting the pH of a polyvinyl pyrrolidone (PVP) subcombination prepared according to Example S4 to 3.1 to 3.3 with nitric acid and then combining the pH adjusted polyvinyl pyrrolidone (PVP) subcombination with a silver ion subcombination prepared according to Example S5 in a 1 L conical-bottom container and then sequentially rinsing the flask containing the polyvinyl pyrrolidone (PVP) subcombination and the flask containing the silver ion subcombination with water (102 mL) into the conical-bottom container. The comingled polyvinyl pyrrolidone/silver ion subcombination contained in the conical-bottom container was then gently sparged continuously with nitrogen until transferred to the reactor.

Example S7: Reducing Sugar/Polyvinyl Pyrrolidone (PVP) Subcombination

The reducing sugar/polyvinyl pyrrolidone (PVP) subcombination used herein in certain Examples was prepared by adding polyvinyl pyrrolidone (52.2 g; weight average molecular weight of 50,000 g/mol Sokalan® K30 P available from BASF) to water (1,958 mL) in a flask. Then adding D-glucose (13.5 g; 98% available from Sigma-Aldrich) to the flask.

Example S8: Silver Ion Subcombination

The silver ion subcombination used herein in certain Examples was prepared by adding $AgNO_3$ (12.7 g; ACS reagent grade, ≥99.0% available from Sigma Aldrich) to water (612 mL) in a flask. Then transferring the flask contents to an HPLC reservoir and rinsing the flask and transfer equipment with water (81 mL) into the HPLC reservoir.

Preparation of Silver Nanowires

Comparative Examples C1-C2 and Examples 1-27

In each of Comparative Examples C1-C2 and Examples 1-27, an 8 liter stainless steel pressure reactor outfitted with a three blade propeller style agitator, a temperature control unit with an external resistive heating mantle and an internal cooling tube to facilitate temperature control was used. In each of Comparative Examples C1-C2 and Examples 1-27, a reducing sugar/copper (II) ion/halide ion subcombination prepared according to Example S3 was added to the reactor. The transfer equipment was then rinsed with water (152 mL) into the reactor. The reactor was then closed up and the agitator was engaged at 200 rpm. The vapor space in the reactor was then purged with >90 psig nitrogen four times to a pressure of >60 psig with a hold at pressure for three minutes for each purge. The reactor was left with a nitrogen blanket at 16.1 psig following the final purge. The set point for the temperature control unit was then set to 150° C. Once the contents of the reactor reached a temperature of 150° C. the silver ion subcombination prepared according to Example S5 and the polyvinyl pyrrolidone (PVP) subcombination prepared according to Example S4 were then transferred to the reactor in the manner noted below for each of Comparative Examples C1-C2 and Examples 1-27.

Comparative Examples C1-C2

In each of Comparative Examples C1-C2, $\frac{1}{5}^{th}$ of a silver ion subcombination prepared according to Example S5 and $\frac{1}{5}^{th}$ of a polyvinyl pyrrolidone (PVP) subcombination prepared according to Example S4 were transferred to the reactor simultaneously, but separately over a 60 second charge time to form a creation mixture. The silver ion subcombination was added to the reactor at a point below the surface of the combination in the reactor. The polyvinyl pyrrolidone (PVP) subcombination was added to the reactor onto the surface of the combination in the reactor. Following a delay period of twenty minutes, the remaining $\frac{4}{5}^{th}$ of the silver ion subcombination and the remaining $\frac{4}{5}^{th}$ of the polyvinyl pyrrolidone (PVP) subcombination were transferred to the reactor in similar fashion—simultaneously, but separately—over a 10 minute feed time to form a growth mixture. During the delay period, the set point for the temperature controller was linearly ramped down from 150° C. to 130° C., with the ramp starting 10 minutes into the delay period and ending with the delay period. The growth mixture was then stirred for a hold time of eight hours to form a product mixture. The product mixture was then cooled to room temperature. The agitator was disengaged. The reactor was then vented to relieve any pressure build up in the vessel. The reactor contents were then collected.

Examples 1-10

In each of Examples 1-10, $\frac{1}{5}^{th}$ of a comingled polyvinyl pyrrolidone/silver ion subcombination prepared according to Example S6 following a premix period after its preparation, as noted in TABLE 1, was transferred to the reactor over a 1 minute charge time at a point below the surface of the combination in the reactor to form a creation mixture. Following a delay period of twenty minutes, the remaining $\frac{4}{5}^{th}$ of the comingled polyvinyl pyrrolidone/silver ion subcombination was then transferred to the reactor over a 10 minute feed time at a point below the surface of the creation mixture to form a growth mixture. During the delay period, the set point for the temperature controller was linearly ramped down from 150° C. to the temperature noted in TABLE 1, with the ramp starting 10 minutes into the delay period and ending with the delay period. The growth mixture was then stirred for a hold time as noted in TABLE 1 to form a product mixture. The product mixture was then cooled to room temperature. The agitator was disengaged. The reactor was then vented to relieve any pressure build up in the vessel. The reactor contents were then collected.

TABLE 1

| Ex.# | Premix Period (mins) | Temp. (° C.) | Hold Time (hrs) |
|---|---|---|---|
| 1 | <60 | 130 | 18 |
| 2 | <60 | 130 | 8 |
| 3 | 120 | 130 | 8 |
| 4 | 240 | 130 | 8 |
| 5 | 960 | 130 | 8 |
| 6 | 10 | 130 | 8 |
| 7 | <60 | 130 | 8 |
| 8 | <60 | 130 | 18 |
| 9 | <60 | 132 | 8 |
| 10 | <60 | 130 | 18 |

Examples 11-25

In each of Examples 11-25, nitric acid was added to the combination in the reactor to adjust the pH of the combination to the pH noted in TABLE 2. Then, $\frac{1}{5}^{th}$ of a comingled polyvinyl pyrrolidone/silver ion subcombination prepared according to Example S6 following a premix period after its preparation, as noted in TABLE 2, was transferred to the reactor over a 1 minute charge time at a point below the surface of the combination in the reactor to form a creation mixture. Following a delay period of twenty minutes, the remaining $\frac{4}{5}^{th}$ of the comingled polyvinyl pyrrolidone/silver ion subcombination was then transferred to the reactor over a 10 minute feed time at a point below the surface of the creation mixture to form a growth mixture. During the delay period, the set point for the temperature controller was linearly ramped down from 150° C. to the temperature noted in TABLE 2, with the ramp starting 10 minutes into the delay period and ending with the delay period. The growth mixture was then stirred for a hold time as noted in TABLE 2 to form a product mixture. The product mixture was then cooled to room temperature. The agitator was disengaged. The reactor was then vented to relieve any pressure build up in the vessel. The reactor contents were then collected.

TABLE 2

| Ex.# | pH | Premix Period (mins) | Temp. (° C.) | Hold Time (hrs) |
|---|---|---|---|---|
| 11 | 3.4 | <60 | 130 | 8 |
| 12 | 3.4 | <60 | 130 | 8 |
| 13 | 3.3 | 5 | 130 | 8 |
| 14 | 2.5 | 5 | 130 | 8 |
| 15 | 3.3 | 5 | 130 | 18 |
| 16 | 2.5 | <60 | 130 | 8 |
| 17 | 2.5 | <60 | 130 | 18 |
| 18 | 2.5 | <60 | 130 | 12 |
| 19 | 2.5 | <60 | 130 | 18 |
| 20 | 2.5 | <60 | 130 | 8 |
| 21 | 2.5 | <60 | 130 | 8 |
| 22 | 2.5 | <60 | 130 | 8 |
| 23 | 2.5 | <60 | 130 | 8 |
| 24 | 2.5 | <60 | 130 | 8 |
| 25 | 2.5 | <60 | 130 | 18 |

Example 26

Over a 1 minute charge time, $\frac{1}{5}^{th}$ of a silver ion subcombination prepared according to Example S5; and, $\frac{1}{5}^{th}$ of a polyvinyl pyrrolidone (PVP) subcombination prepared according to Example S4 that was pH adjusted to 3.1 to 3.3 with nitric acid, were transferred to the reactor simultaneously through a mixing tee forming a comingled polyvinyl pyrrolidone/source of silver ions with a premix time of 2.7 seconds before entering the reactor at a point below the surface of the combination in the reactor to form a creation mixture. Following a delay period of twenty minutes, the remaining $\frac{4}{5}^{th}$ of the silver ion subcombination and the remaining $\frac{4}{5}^{th}$ of the polyvinyl pyrrolidone (PVP) subcombination were comingled through the mixing tee with a comingling time of 6.8 seconds before entering the reactor at a point below the surface of the creation mixture over a 10 minute feed time to form a growth mixture. During the delay period, the set point for the temperature controller was linearly ramped down from 150° C. to 130° C., with the ramp starting 10 minutes into the delay period and ending with the delay period. The growth mixture was then stirred for a hold time of eight hours to form a product mixture. The product mixture was then cooled to room temperature. The agitator was disengaged. The reactor was then vented to relieve any pressure build up in the vessel. The reactor contents were then collected.

Example 27

Over a 1 minute charge time, $\frac{1}{5}^{th}$ of a comingled polyvinyl pyrrolidone/silver ion subcombination prepared according to Example S6 with a premix period of <60 minutes was transferred to the reactor at a point below the surface of the combination in the reactor to form a creation mixture. Following a delay period of twenty minutes, $\frac{4}{5}^{th}$ of a silver ion subcombination prepared according to Example S5 and $\frac{4}{5}^{th}$ of a polyvinyl pyrrolidone (PVP) subcombination prepared according Example S4 that was pH adjusted to 3.1 to 3.3 with nitric acid, were transferred simultaneously, but separately, to a point below the surface of the creation mixture in the reactor over a 10 minute feed time to form a growth mixture. During the delay period, the set point for the temperature controller was linearly ramped down from 150° C. to 130° C., with the ramp starting 10 minutes into the delay period and ending with the delay period. The growth mixture was then stirred for a hold time of eight hours to form a product mixture. The product mixture was then cooled to room temperature. The agitator was disengaged. The reactor was then vented to relieve any pressure build up in the vessel. The reactor contents were then collected.

Comparative Example C3

An 8 L stainless steel pressure reactor outfitted with an overhead mixer and a temperature controller was used. A halide ion subcombination prepared according to Example S1 was added to a reducing sugar/PVP subcombination prepared according to Example S7 in a flask. A copper (II) ion subcombination prepared according to Example S2 was then added to the flask. The beakers used in the preparation of the halide ion containing subcombination and the copper (II) ion containing subcombination were then rinsed with water (407 mL) into the flask. The pH of the contents of the flask was then adjusted from an initial pH of 3.73 down to a pH of 3.14 with nitric acid (ACS reagent grade 70%). The contents of the flask were then transferred to the reactor. The flask was then rinsed with water (191 mL) into the reactor. The agitator was then engaged at a stirring rate of 200 revolutions per minute. A sample was taken of the reactor contents and the pH was measured at 3.19. A rinse of water (20 mL) was added following the sample. The reactor was then closed up and the vapor space in the reactor was purged with >90 psig nitrogen four times to a pressure of >60 psig with a hold at pressure for three minutes for each purge. The reactor was left with a nitrogen blanket at 16.1 psig following the final purge. The temperature controller was then set at 150° C. After the reactor contents reached 150° C., 20 wt % of a silver ion containing subcombination prepared according to Example S8 was added to the reactor over 1 minute. The reactor contents were then stirred for ten minutes while maintaining the set point of the temperature controller at 150° C. Over the following ten minutes, the set point of the temperature was linearly ramped down to 130° C. The remaining 80 wt % of the silver ion containing subcombination prepared according to Example S8 was then added to the reactor contents over the next ten minutes along with an additional volume of water (102 mL). The reactor contents were then stirred for eighteen hours while maintaining the set point of the temperature controller at 130° C. The reactor contents were then cooled down to room temperature over the next thirty minutes. The reactor was then vented to relieve any pressure build up in the vessel. The mixer was disengaged. The product was then collected.

Recovered Silver Nanowire Analysis

The product silver nanowires from Comparative Examples C1-C3 and Examples 1-27 were then analyzed using an FEI Nova NanoSEM field emission gun scanning electron microscope (SEM) using FEI's Automated Image Acquisition (AIA) program. A drop of cleaned dispersion was taken from the UV/Vis cuvette and drop-cast onto a silica wafer coated SEM stub before being dried under vacuum. Backscatter electron images were collected using an FEI Nova NanoSEM field emission gun scanning electron microscope. FEI's Automated Image Acquisition (AIA) program was used to move the stage, focus, and collect images. Eighteen images of each sample were acquired at 6 μm horizontal field width. Semi-automated image analysis using ImageJ software categorized objects as wires versus particles based on an aspect ratio of 3. Wire widths were automatically measured as well as the total area of wires in the images. Particles were tabulated for individual size and total area of particles in the images. ImageJ software was also used to determine the silver nanowire diameter in TABLE 3. The average length of the silver nanowires was observed to exceed 20 μm, based on the SEM images obtained for the diameter analysis.

ImageJ software was used to analyze SEM images of the product silver nanowires from each of Comparative Examples C1-C3 and Example 1-27 to provide a relative measure of the silver nanoparticles having an aspect ratio of <3 in the product samples. The statistic used for this measure is the nanoparticle fraction, $NP_F$, determined according to the following expression:

$$NP_F = NP_A/T_A;$$

wherein $T_A$ is the total surface area of the substrate that is occluded by a given deposited sample of silver nanowires; and, $NP_A$ is the portion of the total occluded surface area that is attributable to silver nanoparticles having an aspect ratio of <3.

Spectral UV/Vis analysis of the product silver nanowires from each of Comparative Example C1-C3 and Examples 1-27 was performed using a Shimadzu UV 2401 Spectrophotometer. The raw UV/Vis absorbance spectra were normalized so that the local minimum near 320 nm and the local maximum near 375 nm span the range from 0 to 1. The wavelength of maximum absorbance, $\lambda_{max}$, and the normalized absorbance at 500 nm, $Abs_{500}$, are reported in TABLE 3.

TABLE 3

| | Silver Nanowire Diameter (nm) | | | | Spectral Analysis | |
| --- | --- | --- | --- | --- | --- | --- |
| Ex. | Median | Mean | Standard Deviation | $NP_F$ | $\lambda_{max}$ (nm) | $Abs_{500}$ |
| C1 | 45.4 | 54.5 | 29.5 | 0.29 | 381 | 0.4395 |
| C2 | 45.6 | 55.6 | 33.3 | 0.27 | 380 | 0.4227 |
| C3 | 42.0 | 60.0 | 46.0 | 0.24 | 377 | 0.2400 |
| 1 | 33.3 | 39.6 | 19.3 | 0.34 | 374 | 0.5367 |
| 2 | 35.5 | 41.1 | 19.1 | 0.29 | 374 | 0.4869 |
| 3 | 31.2 | 34.1 | 15.5 | 0.33 | 375 | 0.4731 |
| 4 | 32.6 | 39.7 | 22.7 | 0.38 | 375 | 0.5340 |
| 5 | 32.3 | 40.0 | 22.8 | 0.46 | 375 | 0.5653 |
| 6 | 33.0 | 37.4 | 19.0 | 0.28 | 375 | 0.4323 |
| 7 | 31.1 | 37.4 | 19.2 | 0.36 | 375 | 0.5706 |
| 8 | 30.6 | 35.2 | 15.1 | 0.38 | 374 | 0.5354 |
| 9 | 30.6 | 41.4 | 25.2 | 0.39 | 376 | 0.6619 |
| 10 | 30.2 | 37.1 | 20.1 | 0.47 | 375 | 0.8393 |
| 11 | 28.9 | 33.1 | 17.1 | 0.35 | 373 | 0.5365 |
| 12 | 27.6 | 31.3 | 14.9 | 0.38 | 374 | 0.5500 |
| 13 | 28.9 | 36.0 | 18.5 | 0.29 | 373 | 0.5944 |
| 14 | 30.9 | 37.5 | 21.2 | 0.44 | 374 | 0.4092 |
| 15 | 30.2 | 35.4 | 18.2 | 0.40 | 374 | 0.7268 |
| 16 | 32.2 | 33.9 | 12.6 | 0.25 | 373 | 0.3300 |
| 17 | 31.6 | 34.0 | 16.3 | 0.28 | 374 | 0.3729 |
| 18 | 31.6 | 34.5 | 15.1 | 0.21 | 375 | 0.4275 |
| 19 | 33.0 | 37.5 | 21.8 | 0.23 | 374 | 0.3843 |
| 20 | 32.9 | 34.5 | 12.2 | 0.18 | 374 | 0.3353 |
| 21 | 33.0 | 35.2 | 13.8 | 0.27 | 374 | 0.4095 |
| 22 | 30.1 | 33.8 | 16.1 | 0.18 | 374 | 0.3090 |
| 23 | 35.0 | 39.9 | 17.0 | 0.29 | 374 | 0.4005 |
| 24 | 37.7 | 39.9 | 12.1 | 0.18 | 373 | 0.3492 |
| 25 | 31.2 | 38.1 | 23.8 | 0.44 | 374 | 0.3882 |
| 26 | 34.8 | 38.0 | 11.8 | 0.34 | 376 | 0.4162 |
| 27 | 32.4 | 39.9 | 24.5 | 0.29 | 375 | 0.3829 |

We claim:

1. A method for manufacturing high aspect ratio silver nanowires, comprising:
    providing a container;
    providing water;
    providing a reducing sugar;
    providing a polyvinyl pyrrolidone (PVP), wherein the polyvinyl pyrrolidone (PVP) provided is dividable into a first part of the polyvinyl pyrrolidone (PVP) and a second part of the polyvinyl pyrrolidone (PVP);
    providing a source of copper (II) ions;
    providing a source of halide ions;
    providing a source of silver ions, wherein the source of silver ions provided is dividable into a first portion of the source of silver ions and a second portion of the source of silver ions;
    adding the water, the reducing sugar, the source of copper (II) ions and the source of halide ions to the container to form a combination;
    heating the combination to 110 to 160° C.;
    comingling the first part of the polyvinyl pyrrolidone (PVP) with the first portion of the source of silver ions to form a comingled polyvinyl pyrrolidone/source of silver ions;
    adding the comingled polyvinyl pyrrolidone/source of silver ions to the combination in the container to form a creation mixture; then, following a delay period, adding to the container the second part of the polyvinyl pyrrolidone (PVP) and the second portion of the source of silver ions to form a growth mixture;
    maintaining the growth mixture at 110 to 160° C. for a hold period of 2 to 30 hours to provide a product mixture; and,
    recovering a plurality of high aspect ratio silver nanowires from the product mixture;
    wherein a total glycol concentration in the container is <0.001 wt %.

2. The method of claim 1, further comprising:
    maintaining the combination at 120 to 155° C. during addition of the comingled polyvinyl pyrrolidone/source of silver ions and during the delay period; and,
    maintaining the growth mixture at 120 to 140° C. during the hold period.

3. The method of claim 1, wherein the second part of the polyvinyl pyrrolidone (PVP) and the second portion of the source of silver ions are added to the container simultaneously following the delay period.

4. The method of claim 1, wherein the second part of the polyvinyl pyrrolidone (PVP) and the second portion of the source of silver ions are comingled for comingling period of 0.5 seconds to 1 hour before being added to the container following the delay period.

5. The method of claim 1, wherein the first part of the polyvinyl pyrrolidone (PVP) and the first portion of the source of silver ions are comingled for a comingling period of 0.5 seconds to 1 hour to form the comingled polyvinyl pyrrolidone/source of silver ions before being added to the container.

6. The method of claim 1, wherein the first part of the polyvinyl pyrrolidone (PVP) is 10 to 40 wt % of the polyvinyl pyrrolidone (PVP) provided; and, wherein the first portion of the source of silver ions is 10 to 40 wt % of the source of silver ions provided.

7. The method of claim 6, further comprising:
    providing a pH adjusting agent;
    adding the pH adjusting agent to the combination before adding the comingled polyvinyl pyrrolidone/source of silver ions; wherein the combination has a pH of 2.0 to 4.0 before adding the comingled polyvinyl pyrrolidone/source of silver ions to the container.

8. The method of claim 6, further comprising:
    providing a reducing agent;
    adding the reducing agent to the creation mixture.

9. The method of claim 1, further comprising:
purging a container vapor space in contact with the combination in the container to provide a reduced oxygen gas concentration in the container vapor space;
sparging the source of silver ions provided with an inert gas to extract entrained oxygen gas from the source of silver ions provided and to provide a low oxygen gas concentration in a silver ion vapor space in contact with the source of silver ions provided, wherein the low oxygen gas concentration in the silver ion vapor space is less than or equal to 10,000 ppm;
purging a PVP vapor space in contact with the polyvinyl pyrrolidone (PVP) provided to provide a diluted oxygen gas concentration in the PVP vapor space, wherein the diluted oxygen gas concentration in the PVP vapor space is less than or equal to 10,000 ppm;
maintaining the low oxygen gas concentration in the silver ion vapor space and the diluted oxygen gas concentration in the PVP vapor space; and,
maintaining the reduced oxygen gas concentration in the container vapor space during addition of the comingled polyvinyl pyrrolidone/source of silver ions, during formation of the growth mixture, and during the hold period.

10. A method for manufacturing high aspect ratio silver nanowires, comprising:
providing a container;
providing water;
providing a reducing sugar;
providing a polyvinyl pyrrolidone (PVP);
providing a source of copper (II) ions;
providing a source of halide ions;
providing a source of silver ions;
dividing the water into five separate volumes;
combining a first volume of water with the reducing sugar to form a reducing sugar sub combination;
combining a second volume of water with the polyvinyl pyrrolidone (PVP) provided to form a polyvinyl pyrrolidone (PVP) subcombination, wherein the polyvinyl pyrrolidone (PVP) subcombination is dividable into a first part of the polyvinyl pyrrolidone (PVP) subcombination and a second part of the polyvinyl pyrrolidone (PVP) subcombination;
combining a third volume of water with the source of copper (II) ions to form a copper (II) ion subcombination;
combining a fourth volume of water with the source of halide ions to form a halide ion sub combination;
combining a fifth volume of water with the source of silver ions provided to form a silver ion subcombination, wherein the silver ion subcombination is dividable into a first portion of the silver ion subcombination and a second portion of the silver ion subcombination;
adding the reducing sugar subcombination, the copper (II) ion subcombination and the halide ion subcombination to the container to form a combination;
heating the combination to 110 to 160° C.;
comingling the first part of the polyvinyl pyrrolidone (PVP) subcombination with the first portion of the silver ion subcombination to form a comingled polyvinyl pyrrolidone/silver ion sub combination;
adding the comingled polyvinyl pyrrolidone/silver ion subcombination to the combination in the container to form a creation mixture;
then, following a delay period, adding to the container the second part of the polyvinyl pyrrolidone (PVP) subcombination and the second portion of the silver ion subcombination to form a growth mixture;
maintaining the growth mixture at 110 to 160° C. for a hold period of 2 to 30 hours to provide a product mixture; and,
recovering a plurality of high aspect ratio silver nanowires from the product mixture;
wherein a total glycol concentration in the container is <0.001 wt %.

* * * * *